United States Patent
Aydin et al.

(10) Patent No.: US 10,358,964 B2
(45) Date of Patent: Jul. 23, 2019

(54) INCREASED $NO_x$ CONVERSION BY OZONE INTRODUCTION

(71) Applicant: Johnson Matthey Public Limited Company, London (GB)

(72) Inventors: Ceren Aydin, Audubon, PA (US); Sougato Chatterjee, Audubon, PA (US); Raymond Conway, Audubon, PA (US); Mojghan Naseri, Audubon, PA (US)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/846,253

(22) Filed: Dec. 19, 2017

(65) Prior Publication Data

US 2018/0171850 A1    Jun. 21, 2018

Related U.S. Application Data

(60) Provisional application No. 62/435,931, filed on Dec. 19, 2016.

(51) Int. Cl.
| | |
|---|---|
| *F01N 3/20* | (2006.01) |
| *F01N 13/00* | (2010.01) |
| *F01N 3/08* | (2006.01) |
| *F01N 3/10* | (2006.01) |
| *F01N 3/28* | (2006.01) |
| *F01N 3/035* | (2006.01) |

(52) U.S. Cl.
CPC ........... *F01N 3/2066* (2013.01); *F01N 3/035* (2013.01); *F01N 3/0807* (2013.01); *F01N 3/0842* (2013.01); *F01N 3/106* (2013.01); *F01N 3/2892* (2013.01); *F01N 13/009* (2014.06); *F01N 13/0093* (2014.06); *F01N 13/0097* (2014.06); *F01N 2240/16* (2013.01); *F01N 2240/38* (2013.01); *F01N 2250/02* (2013.01); *F01N 2570/18* (2013.01); *F01N 2610/02* (2013.01); *F01N 2610/03* (2013.01); *F01N 2610/06* (2013.01); *Y02T 10/24* (2013.01)

(58) Field of Classification Search
CPC ............ B01D 53/9409; B01D 53/9418; B01D 53/9422; B01D 53/9427; B01D 53/9436; B01D 53/9459; B01D 53/9463; B01D 53/9477; B01D 53/9481; B01D 2257/40; B01D 2257/404; B01D 2258/012; F01N 3/105; F01N 3/103; F01N 3/20; F01N 3/2066; F01N 3/2882; F01N 13/009; F01N 2250/12; F01N 2250/02; F01N 2570/14; F01N 2610/00; F01N 2610/06
See application file for complete search history.

(56) References Cited

U.S. PATENT DOCUMENTS

| | | | | |
|---|---|---|---|---|
| 6,948,308 | B2 * | 9/2005 | Chandler | ............... B01D 53/56 423/213.2 |
| 7,090,811 | B2 * | 8/2006 | Cho | ...................... F01N 3/2066 423/212 |
| 8,266,895 | B2 * | 9/2012 | Tsujimoto | .......... B01D 53/9409 60/275 |
| 9,657,626 | B2 | 5/2017 | Theis et al. | |
| 9,903,291 | B2 | 2/2018 | Theis et al. | |
| 2009/0260349 | A1 | 10/2009 | Gandhi et al. | |
| 2010/0221164 | A1 | 9/2010 | Lee et al. | |
| 2015/0158019 | A1 | 6/2015 | Rajaram et al. | |
| 2017/0276053 | A1 | 9/2017 | Robel et al. | |
| 2017/0298800 | A1 * | 10/2017 | Idicheria | ............... F01N 3/2066 |

FOREIGN PATENT DOCUMENTS

| | | | | |
|---|---|---|---|---|
| DE | 102015115104 | A1 * | 3/2016 | .......... F02D 41/064 |
| DE | 202016102586 | U1 * | 6/2016 | ........ B01D 53/9477 |
| DE | 102015108896 | A1 | 12/2016 | |
| DE | 102016112363 | A1 | 1/2018 | |
| EP | 1020620 | A1 | 7/2000 | |
| GB | 2502364 | A | 11/2013 | |
| JP | 2007289844 | A | 11/2007 | |
| JP | 2010255487 | A | 11/2010 | |
| WO | 2015085300 | A1 | 6/2015 | |

* cited by examiner

*Primary Examiner* — Timothy C Vanoy

(57) ABSTRACT

Exhaust purification system and methods for the reduction of emissions from an exhaust stream, including an upstream catalyst coupled with a passive $NO_x$ adsorber catalyst; means to contact the exhaust stream with ozone, to react NO in the exhaust stream with the ozone to produce $NO_2$; and an SCR catalyst.

20 Claims, 13 Drawing Sheets

# INCREASED NOₓ CONVERSION BY OZONE

CROSS-REFERENCE TO RELATED APPLICATIONS

This application claims priority to U.S. Provisional Application No. 62/435,931, filed on Dec. 19, 2016, and is incorporated herein by reference.

BACKGROUND

The need to reduce the emission of harmful byproducts and the ever-increasing pressures to increase fuel economy are ongoing challenges with internal combustion engines. Diesel engines produce an exhaust emission that generally contains at least four classes of pollutants that are legislated against by inter-governmental organizations throughout the world: carbon monoxide (CO), unburned hydrocarbons (HCs), oxides of nitrogen ($NO_x$) and particulate matter (PM). A variety of emissions control devices exist for treating one or more of each type of pollutant. These emissions control devices are often combined as part of an exhaust system to ensure that all four classes of pollutant are treated before emission of the exhaust gas into the environment.

Various processes for the treatment of the exhaust gas proceed more rapidly when the $NO_x$ species in the exhaust gas comprises higher percentages of $NO_2$ rather than NO. As a result, it may be desirable to provide an exhaust gas with higher percentages of $NO_2$ to further boost NOx conversion in systems including such processes.

SUMMARY OF THE INVENTION

According to some embodiments of the present invention, an exhaust purification system for the reduction of emissions from an exhaust stream, includes, in order: an upstream catalyst coupled with a passive $NO_x$ adsorber catalyst; means to contact the exhaust stream with ozone, to react NO in the exhaust stream with the ozone to produce $NO_2$; and an SCR catalyst. In some embodiments, the upstream catalyst comprises an oxidation catalyst and/or a cold start catalyst. The passive $NO_x$ adsorber catalyst may include a filter substrate. In some embodiments, the upstream catalyst and the passive NOx adsorber catalyst are included on a single substrate. The system may further include a means for heating the exhaust gas upstream of the SCR catalyst, such as an electrical heater. In some embodiments, the means for heating the exhaust gas is located upstream of the means to contact the exhaust stream with ozone. The means to contact the exhaust stream with ozone may include, for example, an ozone generator. The system may further include an SCRF catalyst, which may be located upstream of the SCR catalyst. In some embodiments, the system may further include an ASC downstream of the SCR catalyst.

According to some embodiments of the present invention, a method of reducing emissions from an exhaust stream includes: contacting the exhaust stream with an upstream catalyst coupled with a passive NOx adsorber catalyst; oxidizing NO to $NO_2$ by contacting the exhaust stream with ozone; and selectively catalytically reducing $NO_2$ to nitrogen by contacting the $NO_2$ produced from the oxidizing step with a reductant in the presence of an SCR catalyst. In some embodiments, the upstream catalyst includes an oxidation catalyst and/or a cold start catalyst. The passive $NO_x$ adsorber catalyst may include a filter substrate. In some embodiments, the upstream catalyst and the passive NOx adsorber catalyst are included on a single substrate. The method may further include heating the exhaust stream upstream of the SCR catalyst, such as by an electrical heater. In some embodiments, the exhaust stream is heated before contacting the exhaust stream with ozone. In some embodiments, the ozone is injected into the exhaust stream. The selective catalytic reduction step may include contacting the exhaust stream with the SCR catalyst, and may further include contacting the exhaust stream with an SCRF catalyst. In some embodiments, the SCRF catalyst is located upstream of the SCR catalyst. The selective catalytic reduction step may further include contacting the exhaust gas with an ASC downstream of the SCR catalyst. In some embodiments, the reductant is ammonia.

In some embodiments, about 20 wt % to about 80 wt %, preferably about 50 wt % of the NO in the exhaust stream contacting the ozone is reacted with the ozone to produce $NO_2$. In some embodiments, the exhaust stream comprises a $NO_2/NO_x$ % value of about 20 wt % to about 70 wt %, preferably about 50 wt % at initiation of the selective catalytic reduction step. In some embodiments, the step of oxidizing NO to $NO_2$ is carried out at exhaust stream temperatures of below 250° C., or temperatures of about 30° C. to about 250° C. NOx conversion of methods of the present invention may be higher than NOx conversion of a method which is equivalent except lacks the step of oxidizing NO to $NO_2$ by contacting the exhaust stream with ozone; in some embodiments, the NOx conversion may be about 4% to about 12% higher, or about 5% to about 6% higher. NOx conversion of methods of the present invention may be higher than NOx conversion of a method which is equivalent except lacks steps of oxidizing NO to $NO_2$ by contacting the exhaust stream with ozone and the heating step; in some embodiments, the NOx conversion of the method may be about 4% to about 12% higher, or about 8% to about 10% higher.

DETAILED DESCRIPTION

Figure 1A:
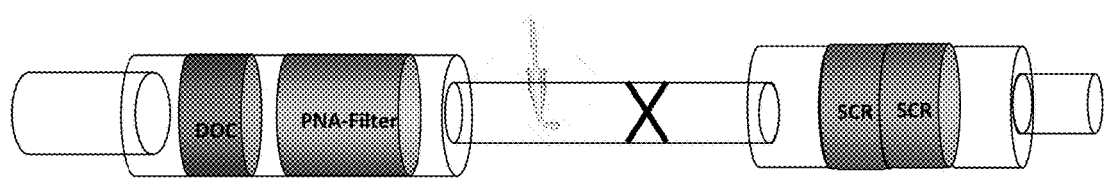
FIG. 1A shows a system having a DOC coupled with a PNA on a filter, followed by a downstream SCR catalyst.

Systems and methods of the present invention relate to purification of an exhaust gas from an internal combustion engine. The invention is particularly directed to cleaning of an exhaust gas from a diesel engine.

Although nitrogen monoxide (NO) is the most abundant nitrogen species in an engine exhaust stream, various processes for the treatment of the exhaust gas proceed more rapidly when the $NO_x$ species is $NO_2$ rather than NO. For example, in strategies to combat NOx emissions from lean-burn engines, such as selective catalytic reduction (SCR) catalysts, there are indications that the presence of $NO_2$ may be beneficial. It is desired, therefore, to provide an exhaust stream to the SCR catalyst which contains an increased percentage of $NO_2$ rather than NO.

As such, systems and methods of the present invention are configured to increase NO oxidation to $NO_2$ (i.e., $NO_2$-make) by introducing ozone ($O_3$) into the exhaust stream. Ozone has been found to act as an oxidizing agent for the NO in an exhaust stream. Especially at low temperatures such as cold start conditions, $NO_2$-make is usually limited to the oxidation catalyst performance upstream of an SCR catalyst. However, it has surprisingly been found that higher $NO_2$-make through NO oxidation by ozone, combined with incorporation of an upstream catalyst coupled with a passive $NO_x$ adsorber, may lead to higher $NO_x$ conversion (i.e., lower $NO_x$ tailpipe emissions) across an SCR catalyst system.

Systems of the present invention may include an upstream catalyst coupled with a NOx adsorber catalyst, a means to contact the exhaust stream with ozone to react the NO in the exhaust stream with the ozone to produce $NO_2$, and an SCR catalyst.

DOC

Systems of the present invention may include one or more diesel oxidation catalysts. Oxidation catalysts, and in particular diesel oxidation catalysts (DOCs), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

Cold Start Catalyst

Systems of the present invention may include one or more cold start catalysts. A cold start catalyst is a device that is effective to adsorb $NO_x$ and hydrocarbons (HC) at or below a set temperature and to convert and release the adsorbed $NO_x$ and HC at temperatures above the low temperature. Preferably, the set temperature is about 200° C., about 250° C., or between about 200° C. to about 250° C. An example of a suitable cold start catalyst is described in WO 2015085300, which is incorporated by reference herein in its entirety.

A cold start catalyst may comprise a molecular sieve catalyst and a supported platinum group metal catalyst. The molecular sieve catalyst may include or consist essentially of a noble metal and a molecular sieve. The supported platinum group metal catalyst comprises one or more platinum group metals and one or more inorganic oxide carriers. The noble metal is preferably palladium, platinum, rhodium, gold, silver, iridium, ruthenium, osmium, or mixtures thereof.

The molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons.

The molecular sieve may preferably be a small pore molecular sieve having a maximum ring size of eight tetrahedral atoms, a medium pore molecular sieve having a maximum ring size of ten tetrahedral atoms, or a large pore molecular sieve having a maximum ring size of twelve tetrahedral atoms. More preferably, the molecular sieve has a framework structure of AEI, MFI, EMT, ERI, MOR, FER, BEA, FAU, CHA, LEV, MWW, CON, EUO, or mixtures thereof.

The supported platinum group metal catalyst comprises one or more platinum group metals ("PGM") and one or more inorganic oxide carriers. The PGM may be platinum, palladium, rhodium, iridium, or combinations thereof, and most preferably platinum and/or palladium. The inorganic oxide carriers most commonly include oxides of Groups 2, 3, 4, 5, 13 and 14 elements. Useful inorganic oxide carriers preferably have surface areas in the range 10 to 700 $m^2/g$, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a platinum compound (such as platinum nitrate) may be supported on an inorganic oxide by impregnation, adsorption, ion-exchange, incipient wetness, precipitation, or the like. Other metals, such as iron, manganese, cobalt and barium, may also be added to the supported PGM catalyst.

A cold start catalyst of the present invention may be prepared by processes well known in the art. The molecular sieve catalyst and the supported platinum group metal catalyst may be physically mixed to produce the cold start catalyst. Preferably, the cold start catalyst further comprises a flow-through substrate or filter substrate. In one embodiment, the molecular sieve catalyst and the supported platinum group metal catalyst are coated onto the flow-through or filter substrate, and preferably deposited on the flow-through or filter substrate using a washcoat procedure to produce a cold start catalyst system.

Passive NOx Adsorber

Systems of the present invention may include one or more passive NOx adsorbers. A passive $NO_x$ adsorber is a device that is effective to adsorb $NO_x$ at or below a low temperature and release the adsorbed $NO_x$ at temperatures above the low temperature. A passive $NO_x$ adsorber may comprise a noble metal and a small pore molecular sieve. The noble metal is preferably palladium, platinum, rhodium, gold, silver, iridium, ruthenium, osmium, or mixtures thereof. Preferably, the low temperature is about 200° C., about 250° C., or between about 200° C. to about 250° C. An example of a suitable passive NOx adsorber is described in U.S. Patent Publication No. 20150158019, which is incorporated by reference herein in its entirety.

The small pore molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons. Other metals (e.g., Fe, Ti, and Ga) may be incorporated into the framework of the small pore molecular sieve to produce a metal-incorporated molecular sieve.

Preferably, the small pore molecular sieve is selected from an aluminosilicate molecular sieve, a metal-substituted aluminosilicate molecular sieve, an aluminophosphate molecular sieve, or a metal-substituted aluminophosphate molecular sieve. More preferably, the small pore molecular sieve is a molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

A suitable passive $NO_x$ adsorber may be prepared by any known means. For instance, the noble metal may be added to the small pore molecular sieve to form the passive $NO_x$ adsorber by any known means. For example, a noble metal compound (such as palladium nitrate) may be supported on the molecular sieve by impregnation, adsorption, ion-exchange, incipient wetness, precipitation, or the like. Other metals may also be added to the passive $NO_x$ adsorber. Preferably, some of the noble metal (more than 1 percent of the total noble metal added) in the passive $NO_x$ adsorber is located inside the pores of the small pore molecular sieve. More preferably, more than 5 percent of the total amount of noble metal is located inside the pores of the small pore molecular sieve; and even more preferably may be greater than 10 percent or greater than 25% or greater than 50 percent of the total amount of noble metal that is located inside the pores of the small pore molecular sieve.

Preferably, the passive $NO_x$ adsorber further comprises a flow-through substrate or filter substrate. The passive $NO_x$ adsorber is coated onto the flow-through or filter substrate, and preferably deposited on the flow-through or filter substrate using a washcoat procedure to produce a passive $NO_x$ adsorber system.

Heating Element

Systems of the present invention may include a heating element. An electrical heating element is included within the exhaust passage of the internal combustion engine, downstream of an upstream catalyst and/or passive NOx adsorber, and upstream of a means for contacting ozone with the exhaust stream. Any suitable electrical heating element may be included in the systems and methods of the present invention.

Systems of the present invention can include heating by engine thermal management. Such a heating system may be provided such that it would specifically increase temperatures at start-up.

In one aspect, an electrical heating element includes an electrically heated honeycomb body having ends and power connections each disposed at a respective one of the ends. The honeycomb body may define a twisting current path over an electrically isolating gap.

In aspects where the electrical heating element is coupled with a catalyst/adsorber as described herein, electrically insulating supporting elements may fasten the honeycomb body to the at least one catalyst carrier body. Alternatively, the catalyst carrier body serving as a support for the heating element may have a catalytically active coating. For example, the catalytically active coating may promote the oxidation or reduction of constituents in the exhaust gas, in particular of carbon monoxide and hydrocarbons or reduction of NOx. The heatable honeycomb body may also be provided with such a catalytically active layer.

The catalyst carrier body and/or the honeycomb body may be formed of smooth and corrugated sheet metal layers, forming honeycombs.

The honeycomb body may have a large surface area, so that good heat transfer to the exhaust gas flowing through is ensured. The heat being generated can be transferred rapidly to the exhaust gas or a downstream component as a result and by radiation. A heating output possibly given off by radiation to a catalyst carrier body disposed upstream in the direction of the exhaust gas is in turn given off from this body to the exhaust gas, so that the full heating output is available for the downstream component.

In some aspects, the honeycomb body may be shaped in such a way that the current path has an approximately meandering or spiraling form.

In some aspects of the invention, the electrical heating element forms a single unit with a catalyst substrate. For example, the electrical heating element may form a single unit with a NOx storage catalyst. In this case, the NOx storage catalyst may be coated on the upstream end of the unit, with the electrical heating element on the downstream end of the unit. Similarly, the electrical heating element may form a single unit with a selective reduction catalyst, hydrolysis catalyst, or oxidation catalyst where the catalyst is coated on the upstream or downstream end of the unit, as desired for the particular system. Preferably, if the electrical heating element forms a single substrate with the NOx storage catalyst, the substrate will include a thermal insulation between the front (not heated) and rear (heated) zones. Generally, however, it is preferable to have the NOx storage catalyst and the heating element on two different substrates to minimize heating of the NOx storage catalyst by the electrical heating element. Alternatively, the electrical heating element may be coated entirely with a catalyst layer, such as a selective reduction catalyst, hydrolysis catalyst, or oxidation catalyst.

The electrical heating element may be a separate component from any of the other components of the system. Alternatively, the electrical heating element can be coupled as part of another component of the system, such as but not limited to, an oxidation catalyst, a cold start catalyst, a passive NOx adsorber, an SCR/SCRF catalyst, particulate filter, mixer, or hydrolysis catalyst.

Ozone

Systems of the present invention include means to contact the exhaust stream with ozone, in order to react NO in the exhaust stream with the ozone to produce $NO_2$. For example, the ozone may be injected into the exhaust stream containing NO. Accordingly, the system may include an injector to inject the ozone into the exhaust stream containing NO.

The engine may include an ozone generator to generate the ozone. The ozone can be generated in ways known in the art. For instance, the ozone generator can be a corona discharge tube through which passes air between two electrodes which are kept at a large potential difference. Alternatively, the ozone generator can be a high energy lamp to ionize oxygen in air to ozone.

Generally, at least 50%, at least 80%, and/or about 100%, of the NO in the exhaust gas contacting the ozone is reacted with the ozone to produce $NO_2$. In some embodiments, about 40% to about 100%; about 40% to about 95%; about 40% to about 90%; about 40% to about 85%; about 40% to about 80%; about 40% to about 75%; about 40% to about 70%; about 40% to about 65%; about 40% to about 60%; about 45% to about 100%; about 45% to about 95%; about 45% to about 90%; about 45% to about 85%; about 45% to about 80%; about 45% to about 75%; about 45% to about 70%; about 45% to about 65%; about 45% to about 60%; about 50% to about 100%; about 50% to about 95%; about 50% to about 90%; about 50% to about 85%; about 50% to about 80%; about 50% to about 75%; about 50% to about 70%; about 50% to about 65%; about 50% to about 60%; about 60% to about 100%; about 60% to about 95%; about 60% to about 90%; about 60% to about 85%; about 60% to about 80%; about 60% to about 75%; about 60% to about 70%; about 70% to about 100%; about 70% to about 95%; about 70% to about 90%; about 70% to about 85%; about 70% to about 80%; about 80% to about 100%; about 80% to about 95%; about 80% to about 90%; about 80% to about 85%; about 90% to about 100%; or about 90% to about 95% of the NO in the exhaust gas contacting the ozone is reacted with the ozone to produce $NO_2$.

Sufficient ozone must be employed to carry out the required degree of conversion of the NO. The conversion is $NO + O_3 \rightarrow NO_2 + O_2$. Generally, the exhaust gas containing NO is contacted with at least 50%, at least 80%, or about 100%, of the amount of ozone required to react stoichiometrically with the NO to produce $NO_2$. In some embodiments, the exhaust gas containing NO is contacted with about 40% to about 100%; about 40% to about 95%; about 40% to about 90%; about 40% to about 85%; about 40% to about 80%; about 40% to about 75%; about 40% to about 70%; about 40% to about 65%; about 40% to about 60%; about 45% to about 100%; about 45% to about 95%; about 45% to about 90%; about 45% to about 85%; about 45% to about 80%; about 45% to about 75%; about 45% to about 70%; about 45% to about 65%; about 45% to about 60%; about 50% to about 100%; about 50% to about 95%; about 50% to about 90%; about 50% to about 85%; about 50% to about 80%; about 50% to about 75%; about 50% to about 70%; about 50% to about 65%; about 50% to about 60%; about 60% to about 100%; about 60% to about 95%; about 60% to about 90%; about 60% to about 85%; about 60% to about 80%; about 60% to about 75%; about 60% to about 70%; about 70% to about 100%; about 70% to about 95%; about 70% to about 90%; about 70% to about 85%; about 70% to about 80%; about 80% to about 100%; about 80% to about 95%; about 80% to about 90%; about 80% to about 85%; about 90% to about 100%; or about 90% to about 95% of the amount of ozone required to react stoichiometrically with the NO to produce $NO_2$.

The amount of ozone may usually be about 0.04-0.16% by volume of the exhaust gas with which it is contacted. The ozone generator is chosen accordingly. As an example, it has been found that for an exhaust gas flow rate of 7,500 liters per hour, containing 400 ppm NO, complete conversion to $NO_2$ can be achieved if 1 liter of air per minute is fed to an ozone generator (Thermo Electron) operating at 60% capacity; if the operation is reduced to below 40% of capacity or the air flow is reduced below 250 ml per minute, the conversion efficiency decreases significantly.

Any ozone in excess over that used in forming the $NO_2$ can be destroyed over a catalyst. However, excess ozone may be employed advantageously to promote the oxidation of hydrocarbon in the exhaust gas, especially at lower temperature.

SCR Catalyst

Systems of the present invention may include one or more SCR catalyst. The system includes an SCR catalyst positioned downstream of the ozone introduction. Systems of the present invention may also include one or more additional SCR catalysts.

The exhaust system of the invention may include an SCR catalyst which is positioned downstream of an injector for introducing ammonia or a compound decomposable to ammonia into the exhaust gas. The SCR catalyst may be positioned directly downstream of the injector for injecting ammonia or a compound decomposable to ammonia (e.g. there is no intervening catalyst between the injector and the SCR catalyst).

The SCR catalyst includes a substrate and a catalyst composition. The substrate may be a flow-through substrate or a filtering substrate. When the SCR catalyst has a flow-through substrate, then the substrate may comprise the SCR catalyst composition (i.e. the SCR catalyst is obtained by extrusion) or the SCR catalyst composition may be disposed or supported on the substrate (i.e. the SCR catalyst composition is applied onto the substrate by a washcoating method).

When the SCR catalyst has a filtering substrate, then it is a selective catalytic reduction filter catalyst, which is referred to herein by the abbreviation "SCRF". The SCRF comprises a filtering substrate and the selective catalytic reduction (SCR) composition. References to use of SCR catalysts throughout this application are understood to include use of SCRF catalysts as well, where applicable.

The selective catalytic reduction composition may comprise, or consist essentially of, a metal oxide based SCR catalyst formulation, a molecular sieve based SCR catalyst formulation, or mixture thereof. Such SCR catalyst formulations are known in the art.

The selective catalytic reduction composition may comprise, or consist essentially of, a metal oxide based SCR catalyst formulation. The metal oxide based SCR catalyst formulation comprises vanadium or tungsten or a mixture thereof supported on a refractory oxide. The refractory oxide may be selected from the group consisting of alumina, silica, titania, zirconia, ceria and combinations thereof.

The metal oxide based SCR catalyst formulation may comprise, or consist essentially of, an oxide of vanadium (e.g. $V_2O_5$) and/or an oxide of tungsten (e.g. $WO_3$) supported on a refractory oxide selected from the group consisting of titania (e.g. $TiO_2$), ceria (e.g. $CeO_2$), and a mixed or composite oxide of cerium and zirconium (e.g. $Ce_xZr_{(1-x)}O_2$, wherein x=0.1 to 0.9, preferably x=0.2 to 0.5).

When the refractory oxide is titania (e.g. $TiO_2$), then preferably the concentration of the oxide of vanadium is from 0.5 to 6 wt % (e.g. of the metal oxide based SCR formulation) and/or the concentration of the oxide of tungsten (e.g. $WO_3$) is from 5 to 20 wt %. More preferably, the oxide of vanadium (e.g. $V_2O_5$) and the oxide of tungsten (e.g. $WO_3$) are supported on titania (e.g. $TiO_2$).

When the refractory oxide is ceria (e.g. $CeO_2$), then preferably the concentration of the oxide of vanadium is from 0.1 to 9 wt % (e.g. of the metal oxide based SCR formulation) and/or the concentration of the oxide of tungsten (e.g. $WO_3$) is from 0.1 to 9 wt %.

The metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$).

The selective catalytic reduction composition may comprise, or consist essentially of, a molecular sieve based SCR catalyst formulation. The molecular sieve based SCR catalyst formulation comprises a molecular sieve, which is optionally a transition metal exchanged molecular sieve. It is preferable that the SCR catalyst formulation comprises a transition metal exchanged molecular sieve.

In general, the molecular sieve based SCR catalyst formulation may comprise a molecular sieve having an aluminosilicate framework (e.g. zeolite), an aluminophosphate framework (e.g. AlPO), a silicoaluminophosphate framework (e.g. SAPO), a heteroatom-containing aluminosilicate framework, a heteroatom-containing aluminophosphate framework (e.g. MeAlPO, where Me is a metal), or a heteroatom-containing silicoaluminophosphate framework (e.g. MeAPSO, where Me is a metal). The heteroatom (i.e. in a heteroatom-containing framework) may be selected from the group consisting of boron (B), gallium (Ga), titanium (Ti), zirconium (Zr), zinc (Zn), iron (Fe), vanadium (V) and combinations of any two or more thereof. It is preferred that the heteroatom is a metal (e.g. each of the above heteroatom-containing frameworks may be a metal-containing framework).

It is preferable that the molecular sieve based SCR catalyst formulation comprises, or consist essentially of, a molecular sieve having an aluminosilicate framework (e.g. zeolite) or a silicoaluminophosphate framework (e.g. SAPO).

When the molecular sieve has an aluminosilicate framework (e.g. the molecular sieve is a zeolite), then typically the molecular sieve has a silica to alumina molar ratio (SAR) of from 5 to 200 (e.g. 10 to 200), preferably 10 to 100 (e.g. 10 to 30 or 20 to 80), such as 12 to 40, more preferably 15 to 30.

Typically, the molecular sieve is microporous. A microporous molecular sieve has pores with a diameter of less than 2 nm (e.g. in accordance with the IUPAC definition of "microporous" [see *Pure & Appl. Chem.*, 66(8), (1994), 1739-1758)]).

The molecular sieve based SCR catalyst formulation may comprise a small pore molecular sieve (e.g. a molecular sieve having a maximum ring size of eight tetrahedral atoms), a medium pore molecular sieve (e.g. a molecular sieve having a maximum ring size of ten tetrahedral atoms) or a large pore molecular sieve (e.g. a molecular sieve having a maximum ring size of twelve tetrahedral atoms) or a combination of two or more thereof.

When the molecular sieve is a small pore molecular sieve, then the small pore molecular sieve may have a framework structure represented by a Framework Type Code (FTC) selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, LTA, KFI, MER, MON, NSI, OWE, PAU, PHI, RHO, RTH, SAT, SAV, SFW, SIV, THO, TSC, UEI, UFI, VNI, YUG and ZON, or a mixture and/or an intergrowth of two or more thereof. Preferably, the small pore molecular sieve has a framework structure represented by a FTC selected from the group consisting of CHA, LEV, AEI, AFX, ERI, LTA, SFW, KFI, DDR and ITE. More preferably, the small pore molecular sieve has a framework structure represented by a FTC selected from the group consisting of CHA and AEI. The small pore molecular sieve may have a framework structure represented by the FTC CHA. The small pore molecular sieve may have a framework structure represented by the FTC AEI. When the small pore molecular sieve is a zeolite and has a framework represented by the FTC CHA, then the zeolite may be chabazite.

When the molecular sieve is a medium pore molecular sieve, then the medium pore molecular sieve may have a framework structure represented by a Framework Type Code (FTC) selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, -PAR, PCR, PON, PUN, RRO, RSN, SFF, SFG, STF, STI, STT, STW, -SVR, SZR, TER, TON, TUN, UOS, VSV, WEI and WEN, or a mixture and/or an intergrowth of two or more thereof. Preferably, the medium pore molecular sieve has a framework structure represented by a FTC selected from the group consisting of FER, MEL, MFI, and STT. More preferably, the medium pore molecular sieve has a framework structure represented by a FTC selected from the group consisting of FER and MFI, particularly MFI. When the medium pore molecular sieve is a zeolite and has a framework represented by the FTC FER or MFI, then the zeolite may be ferrierite, silicalite or ZSM-5.

When the molecular sieve is a large pore molecular sieve, then the large pore molecular sieve may have a framework structure represented by a Framework Type Code (FTC) selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, -RON, RWY, SAF, SAO, SBE, SBS, SBT, SEW, SFE, SFO, SFS, SFV, SOF, SOS, STO, SSF, SSY, USI, UWY, and VET, or a mixture and/or an intergrowth of two or more thereof. Preferably, the large pore molecular sieve has a framework structure represented by a FTC selected from the group consisting of AFI, BEA, MAZ, MOR, and OFF. More preferably, the large pore molecular sieve has a framework structure represented by a FTC selected from the group consisting of BEA, MOR and MFI. When the large pore molecular sieve is a zeolite and has a framework represented by the FTC BEA, FAU or MOR, then the zeolite may be a beta zeolite, faujasite, zeolite Y, zeolite X or mordenite.

In general, it is preferred that the molecular sieve is a small pore molecular sieve.

The molecular sieve based SCR catalyst formulation preferably comprises a transition metal exchanged molecular sieve. The transition metal may be selected from the group consisting of cobalt, copper, iron, manganese, nickel, palladium, platinum, ruthenium and rhenium.

The transition metal may be copper. An advantage of SCR catalyst formulations containing a copper exchanged molecular sieve is that such formulations have excellent low temperature $NO_x$ reduction activity (e.g. it may be superior to the low temperature $NO_x$ reduction activity of an iron exchanged molecular sieve). Systems and method of the present invention may include any type of SCR catalyst, however, SCR catalysts including copper ("Cu-SCR catalysts") may experience more notable benefits from systems of the present invention, as they are particularly vulnerable to the effects of sulfation. Cu-SCR catalyst formulations may include, for example, Cu exchanged SAPO-34, Cu exchanged CHA zeolite, Cu exchanged AEI zeolites, or combinations thereof.

The transition metal may be present on an extra-framework site on the external surface of the molecular sieve or within a channel, cavity or cage of the molecular sieve.

Typically, the transition metal exchanged molecular sieve comprises an amount of 0.10 to 10% by weight of the transition metal exchanged molecular, preferably an amount of 0.2 to 5% by weight.

In general, the selective catalytic reduction catalyst comprises the selective catalytic reduction composition in a total concentration of 0.5 to 4.0 g in$^{-3}$, preferably 1.0 to 3.0 4.0 g in$^{-3}$.

The SCR catalyst composition may comprise a mixture of a metal oxide based SCR catalyst formulation and a molecular sieve based SCR catalyst formulation. The (a) metal oxide based SCR catalyst formulation may comprise, or consist essentially of, an oxide of vanadium (e.g. $V_2O_5$) and optionally an oxide of tungsten (e.g. $WO_3$), supported on titania (e.g. $TiO_2$) and (b) the molecular sieve based SCR catalyst formulation may comprise a transition metal exchanged molecular sieve.

When the SCR catalyst is an SCRF, then the filtering substrate may preferably be a wall flow filter substrate monolith, such as described herein in relation to a catalyzed soot filter. The wall flow filter substrate monolith (e.g. of the SCR-DPF) typically has a cell density of 60 to 400 cells per square inch (cpsi). It is preferred that the wall flow filter substrate monolith has a cell density of 100 to 350 cpsi, more preferably 200 to 300 cpsi.

The wall flow filter substrate monolith may have a wall thickness (e.g. average internal wall thickness) of 0.20 to 0.50 mm, preferably 0.25 to 0.35 mm (e.g. about 0.30 mm).

Generally, the uncoated wall flow filter substrate monolith has a porosity of from 50 to 80%, preferably 55 to 75%, and more preferably 60 to 70%.

The uncoated wall flow filter substrate monolith typically has a mean pore size of at least 5 µm. It is preferred that the mean pore size is from 10 to 40 µm, such as 15 to 35 µm, more preferably 20 to 30 µm.

The wall flow filter substrate may have a symmetric cell design or an asymmetric cell design.

In general for an SCRF, the selective catalytic reduction composition is disposed within the wall of the wall-flow filter substrate monolith. Additionally, the selective catalytic reduction composition may be disposed on the walls of the inlet channels and/or on the walls of the outlet channels.

Additional Components

Systems of the present invention may include additional components as suitable to achieve the desired effect in the particular system.

Reductant/Urea Injector

The system may include a means for introducing a nitrogenous reductant into the exhaust system upstream of the SCR and/or SCRF catalyst. It may be preferred that the means for introducing a nitrogenous reductant into the exhaust system is directly upstream of the SCR or SCRF catalyst (e.g. there is no intervening catalyst between the means for introducing a nitrogenous reductant and the SCR or SCRF catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce NOx therein. Preferred control means may include an electronic control unit, optionally an engine control unit, and may additionally comprise a NOx sensor located downstream of the NO reduction catalyst.

NOx Storage Catalyst

Systems of the present invention may include one or more NOx storage catalysts. NOx storage catalysts may include devices that adsorb, release, and/or reduce NOx according to certain conditions, generally dependent on temperature and/or rich/lean exhaust conditions. NOx storage catalysts may include, for example, passive NOx adsorbers, cold start catalysts, NOx traps, and the like.

NOx Traps

Systems of the present invention may include one or more NOx traps. NOx traps are devices that adsorb NOx under lean exhaust conditions, release the adsorbed NOx under rich conditions, and reduce the released NOx to form $N_2$.

A NOx trap of embodiments of the present invention may include a NOx adsorbent for the storage of NOx and an oxidation/reduction catalyst. Typically, nitric oxide reacts with oxygen to produce $NO_2$ in the presence of the oxidation catalyst. Second, the $NO_2$ is adsorbed by the NOx adsorbent in the form of an inorganic nitrate (for example, BaO or $BaCO_3$ is converted to $Ba(NO_3)_2$ on the NOx adsorbent). Lastly, when the engine runs under rich conditions, the stored inorganic nitrates decompose to form NO or $NO_2$ which are then reduced to form $N_2$ by reaction with carbon monoxide, hydrogen, and/or hydrocarbons (or via $NH_x$ or NCO intermediates) in the presence of the reduction catalyst. Typically, the nitrogen oxides are converted to nitrogen, carbon dioxide, and water in the presence of heat, carbon monoxide, and hydrocarbons in the exhaust stream.

The NOx adsorbent component is preferably an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst may include one or more noble metals. Suitable noble metals may include platinum, palladium, and/or rhodium. Preferably, platinum is included to perform the oxidation function and rhodium is included to perform the reduction function. The oxidation/reduction catalyst and the NOx adsorbent may be loaded on a support material such as an inorganic oxide for use in the exhaust system.

Ammonia Oxidation Catalyst

Systems of the present invention may include one or more ammonia oxidation catalysts, also called an ammonia slip catalyst ("ASC"). One or more ASC may be included downstream from an SCR catalyst, to oxidize excess ammonia and prevent it from being released to the atmosphere. In some embodiments the ASC may be included on the same substrate as an SCR catalyst. In certain embodiments, the ammonia oxidation catalyst material may be selected to favor the oxidation of ammonia instead of the formation of $NO_x$ or $N_2O$. Preferred catalyst materials include platinum, palladium, or a combination thereof, with platinum or a platinum/palladium combination being preferred. Preferably, the ammonia oxidation catalyst comprises platinum and/or palladium supported on a metal oxide. Preferably, the catalyst is disposed on a high surface area support, including but not limited to alumina.

Three-Way Catalysts

Systems of the present invention may include one or more three-way catalysts (TWCs). TWCs are typically used in gasoline engines under stoichiometric conditions in order to convert $NO_x$ to $N_2$, carbon monoxide to $CO_2$, and hydrocarbons to $CO_2$ and $H_2O$ on a single device.

Filters

Systems of the present invention may include one or more particulate filters. Particulate filters are devices that reduce particulates from the exhaust of internal combustion engines. Particulate filters include catalyzed particulate filters and bare (non-catalyzed) particulate filters. Catalyzed particulate filters, also called catalyzed soot filters, (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Substrate

Catalysts and adsorbers of the present invention may each further comprise a flow-through substrate or filter substrate. In one embodiment, the catalyst/adsorber may be coated onto the flow-through or filter substrate, and preferably deposited on the flow-through or filter substrate using a washcoat procedure.

The combination of an SCR catalyst and a filter is known as a selective catalytic reduction filter (SCRF catalyst). An SCRF catalyst is a single-substrate device that combines the functionality of an SCR and particulate filter, and is suitable for embodiments of the present invention as desired. Description of and references to the SCR catalyst throughout this application are understood to include the SCRF catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval. The flow-through substrate may also be high porosity which allows the catalyst to penetrate into the substrate walls.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Fuel Injector

Systems of the present invention may include one or more fuel injectors. For example, a system may include a secondary fuel injector upstream of a diesel oxidation catalyst. Any suitable type of fuel injector may be used in systems of the present invention.

Embodiments/Systems

Systems of the present invention may include an upstream catalyst coupled with a NOx adsorber catalyst, means to contact the exhaust stream with ozone to react the NO in the exhaust stream with the ozone to produce $NO_2$, and an SCR catalyst.

The upstream catalyst may be positioned between the engine and the means for ozone introduction. The upstream catalyst may include an oxidation catalyst such as a diesel oxidation catalyst, a cold start catalyst, or combinations thereof.

The upstream catalyst may be coupled with a passive NOx adsorber. When the upstream catalyst and the passive NOx adsorber are coupled, the passive NOx adsorber may be placed close to or directly downstream of the upstream catalyst, or they may be included on a single substrate. In some embodiments, the upstream catalyst and the passive NOx adsorber may be de-coupled, with the passive NOx adsorber located further downstream.

A system may include a means for heating the exhaust gas upstream of the SCR catalyst, such as an electrical heater. The mean for heating the exhaust gas may be located upstream of the means to contact the exhaust stream with ozone.

A system may also include an SCRF catalyst. The SCRF catalyst may be located upstream of the SCR catalyst. In some embodiments, a system may also include an ASC downstream of the SCR catalyst.

Systems of the invention may include any suitable additional components to achieve the desired result.

Methods

Methods of reducing emissions from an exhaust stream may include contacting the exhaust stream with an upstream catalyst coupled with a passive NOx adsorber catalyst, oxidizing NO to $NO_2$ by contacting the exhaust stream with ozone, and selectively catalytically reducing $NO_2$ to nitrogen by contacting the $NO_2$ produced from the oxidizing step with a reductant in the presence of an SCR catalyst.

In some embodiments, a method includes heating the exhaust stream upstream of the SCR catalyst, such as by an electrical heater. The exhaust stream may be heated before contacting the exhaust stream with ozone. In some embodiments, the exhaust stream may be heated to a temperature of about 30° C. to about 250° C. In some embodiments, the exhaust stream is heated until the SCR catalyst inlet temperature reaches a temperature of about 200° C. to about 235° C.; about 205° C. to about 230° C.; about 210° C. to about 225° C.; or about 215° C. to about 220° C. In some embodiments, the exhaust stream is heated based on a set amount of time, so as about 400 to about 600 seconds of an FTP cycle.

In some embodiments, a method involves injecting ozone into the exhaust stream. In some embodiments, ozone may be added to the exhaust stream until the SCR catalyst inlet temperature reaches a desired temperature, such as about 100° C. to about 250° C.; about 110° C. to about 240° C.; about 120° C. to about 230° C.; about 130° C. to about 220° C.; about 140° C. to about 210° C.; about 150° C. to about 200° C.; about 160° C. to about 190° C.; about 170° C. to about 180° C.; about 110° C. to about 250° C.; about 120° C. to about 250° C.; about 130° C. to about 250° C.; about 140° C. to about 250° C.; about 150° C. to about 250° C.; about 160° C. to about 250° C.; about 170° C. to about 250° C.; about 180° C. to about 250° C.; about 190° C. to about 250° C.; about 200° C. to about 250° C.; about 210° C. to about 250° C.; about 220° C. to about 250° C.; about 230° C. to about 250° C.; about 150° C. to about 250° C.; about 160° C. to about 240° C.; about 170° C. to about 230° C.; about 180° C. to about 220° C.; about 190° C. to about 220° C.; about 200° C. to about 220° C.; about 100° C.; about 110° C.; about 120° C.; about 130° C.; about 140° C.; about 150° C.; about 160° C.; about 170° C.; about 180° C.; about 190° C.; about 200° C.; about 210° C.; about 220° C.; about 230° C.; about 240° C.; or about 250° C.

The step of oxidizing NO to $NO_2$ may be carried out at any suitable temperature. In some embodiments, this oxidation step is carried out at an exhaust stream temperature of about 250° C. or below, or at an exhaust stream temperature of below about 250° C. In some embodiments, this oxidation step is carried out at exhaust stream temperature of from about 30° C. to about 250° C.; about 35° C. to about 250° C.; about 40° C. to about 250° C.; about 50° C. to about 250° C.; about 60° C. to about 250° C.; about 70° C. to about 250° C.; about 80° C. to about 250° C.; about 90° C. to about 250° C.; about 100° C. to about 250° C.; about 110° C. to about 250° C.; about 120° C. to about 250° C.; about 130° C. to about 250° C.; about 140° C. to about 250° C.; about 150° C. to about 250° C.; about 160° C. to about 250° C.; about 170° C. to about 250° C.; about 180° C. to about 250° C.; about 190° C. to about 250° C.; about 200° C. to about 250° C.; about 210° C. to about 250° C.; about 220° C. to about 250° C.; about 230° C. to about 250° C.; about 30° C. to about 240° C.; about 35° C. to about 240° C.; about 40° C. to about 240° C.; about 50° C. to about 240° C.; about 60° C. to about 240° C.; about 70° C. to about 240° C.; about 80° C. to about 240° C.; about 90° C. to about 240° C.; about 100° C. to about 240° C.; about 110° C. to about 240° C.; about 120° C. to about 240° C.; about 130° C. to about 240° C.; about 140° C. to about 240° C.; about 150° C. to about 240° C.; about 160° C. to about 240° C.; about 170° C. to about 240° C.; about 180° C. to about 240° C.; about 190° C. to about 240° C.; about 200° C. to about 240° C.; about 210° C. to about 240° C.; about 220° C. to about 240° C.; or about 230° C. to about 240° C.

During the step of oxidizing NO to $NO_2$, a significant amount of NO in the exhaust stream contacting the ozone is reacted with the ozone to produce $NO_2$. In some embodiments, the amount of NO in the exhaust stream which is reacted with ozone to produce $NO_2$ is about 10 wt % to about 90 wt % of the NO in the exhaust stream; about 15 wt % to about 85 wt % of the NO in the exhaust stream; about 20 wt % to about 80 wt % of the NO in the exhaust stream; about 25 wt % to about 75 wt % of the NO in the exhaust stream; about 30 wt % to about 70 wt % of the NO in the exhaust stream; about 35 wt % to about 65 wt % of the NO in the exhaust stream; about 40 wt % to about 60 wt % of the NO in the exhaust stream; about 45 wt % to about 55 wt % of the NO in the exhaust stream; about 10 wt % of the NO in the exhaust stream; about 15 wt % of the NO in the exhaust stream; about 20 wt % of the NO in the exhaust stream; about 30 wt % of the NO in the exhaust stream; about 35 wt % of the NO in the exhaust stream; about 40 wt % of the NO in the exhaust stream; about 45 wt % of the NO in the exhaust stream; about 50 wt % of the NO in the exhaust stream; about 55 wt % of the NO in the exhaust stream; about 60 wt % of the NO in the exhaust stream; about 65 wt % of the NO in the exhaust stream; about 70 wt % of the NO in the exhaust stream; about 75 wt % of the NO in the exhaust stream; about 80 wt % of the NO in the exhaust stream; about 85 wt % of the NO in the exhaust stream; or about 90 wt % of the NO in the exhaust stream.

The exhaust stream may have a desired $NO_2/NO_x$ % value before being contacted with ozone and oxidizing NO to $NO_2$. Such value may be referred to as the $NO_2/NO_x$ % value at the initiation of the oxidizing step. In some embodiments, the exhaust stream has a $NO_2/NO_x$ % value of about 10% to about 90%; about 15% to about 85%; about 20% to about 80%; about 25% to about 75 wt %; about 30% to about 70%; about 35% to about 65%; about 40% to about 60%; about 45% to about 55%; about 10%; about 15%; about 20%; about 30%; about 35%; about 40%; about 45%; about 50%; about 55%; about 60%; about 65%; about 70%; about 75%; about 80%; about 85%; or about 90%.

The amount of ozone fed into the exhaust stream may be varied to achieve a desired $NO_2/NO_x$ % value at the inlet of the SCR catalyst. The amount of ozone fed into the exhaust stream may be varied to achieve an $NO_2/NO_x$ % value at the inlet of the SCR catalyst of about 20% to about 80%; about 20% to about 75%; about 20% to about 70%; about 25% to about 75%; about 30% to about 70%; about 35% to about 65%; about 40% to about 60%; about 45% to about 55%;

about 20%; about 25%; about 30%; about 35%; about 40%; about 45%; about 50%; about 55%; about 60%; about 65%; about 70%; about 75%; or about 80%.

In order to selectively catalytically reduce $NO_2$ to nitrogen, the exhaust stream including the $NO_2$ produced from the oxidizing steam may be contacted with the SCR catalyst and a reductant, such as ammonia or urea. In some embodiments, this step may also include contacting the exhaust stream with an SCRF catalyst, which may be located upstream of the SCR catalyst. The exhaust stream may further be contacted with an ASC, which may be located downstream of the SCR catalyst.

Benefits

Systems and methods of the present invention may provide benefits related to higher $NO_x$ conversion (i.e., lower $NO_x$ tailpipe emissions) across an SCR catalyst system. It has surprisingly been found that higher $NO_2$-make through NO oxidation by ozone, combined with incorporation of an upstream catalyst coupled with a passive $NO_x$ adsorber, may lead to increased $NO_x$ conversion even through lower temperatures such as during cold start. Further benefit may be provided by incorporation of a heating element upstream of NO oxidation by ozone.

In some embodiments, systems and methods of the present invention may be beneficial because they have the ability to provide $NO_2$ over a wide range of temperature, thereby enhancing $NO_x$ conversion in the SCR catalyst. For example, in a typical system at low temperatures such as during cold start, $NO_2$-make may be limited to the performance of the catalyst upstream of the SCR catalyst. However, in the systems and methods of the present invention, for SCR catalyst inlet temperatures of up to about 230° C., ozone may be introduced to the exhaust stream as an oxidizing agent to produce $NO_2$ from NO in the exhaust. During this period of lower temperatures, the combination of the upstream catalyst and passive NOx adsorber catalyst can absorb NOx, while the SCR catalyst can function efficiently because of the $NO_2$ generated through contact with the ozone. Once the temperature of the exhaust stream increases, sufficient $NO_2$ may be generated by the upstream catalyst and the ozone introduction may be stopped. In some embodiments, heating the exhaust stream upstream of the ozone introduction can further enhance efficiency of the $NO_x$ conversion of the overall system.

NOx conversion of systems and methods of the present invention may be higher than the NOx conversion of a system or method which is equivalent except lacks the means for/step of oxidizing NO to $NO_2$ by contacting the exhaust stream with ozone. In some embodiments, NOx conversion of a system and/or method of the present invention is higher than the NOx conversion of a system or method which is equivalent except lacks the means for/step of oxidizing NO to $NO_2$ by contacting the exhaust stream with ozone by about 2% to about 20%; about 2% to about 18%; about 2% to about 16%; about 4% to about 14%; about 4% to about 12%; about 4% to about 10%; about 4% to about 8%; about 4% to about 6%; or about 5% to about 6%.

NOx conversion of systems and methods of the present invention may be higher than the NOx conversion of a system or method which is equivalent except lacks the means for/step of heating the exhaust gas upstream of the SCR catalyst and the means for/step of oxidizing NO to $NO_2$ by contacting the exhaust stream with ozone. In some embodiments, NOx conversion of a system and/or method of the present invention is higher than the NOx conversion of a system or method which is equivalent except lacks: (1) the means for/step of heating the exhaust gas upstream of the SCR catalyst, and (2) the means for/step of oxidizing NO to $NO_2$ by contacting the exhaust stream with ozone, by about 2% to about 30%; about 2% to about 28%; about 4% to about 26%; about 4% to about 24%; about 4% to about 22%; about 4% to about 20%; about 4% to about 18%; about 4% to about 16%; about 4% to about 14%; about 6% to about 12%; or about 8% to about 10%.

Definitions

The term "mixed oxide" as used herein generally refers to a mixture of oxides in a single phase, as is conventionally known in the art. The term "composite oxide" as used herein generally refers to a composition of oxides having more than one phase, as is conventionally known in the art.

For the avoidance of doubt, the term "combination of platinum (Pt) and palladium (Pd)" as used herein in relation to a region, zone or layer refers to the presence of both platinum and palladium. The word "combination" does not require that the platinum and palladium are present as a mixture or an alloy, although such a mixture or alloy is embraced by this term.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "about" as used herein with reference to an end point of a numerical range includes the exact end point of the specified numerical range. Thus, for example, an expression defining a parameter as being up to "about 0.2" includes the parameter being up to and including 0.2.

As used herein, "upstream" and "downstream" are relative to the direction of exhaust flow from the engine and to the atmosphere.

EXAMPLES

Example 1

A series of systems were produced and tested for NOx conversion.

First, as shown in FIG. 1A, a system was prepared having a DOC coupled with a PNA on a filter, followed by a downstream SCR catalyst.

Figure 1B:
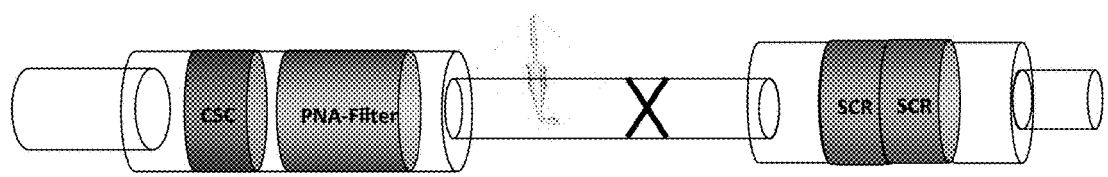
FIG. 1B shows a system having a cold start catalyst coupled with a PNA on a filter, followed by a downstream SCR catalyst.

As shown in FIG. 1B, a system was prepared having a cold start catalyst coupled with a PNA on a filter, followed by a downstream SCR catalyst.

Figure 2A:
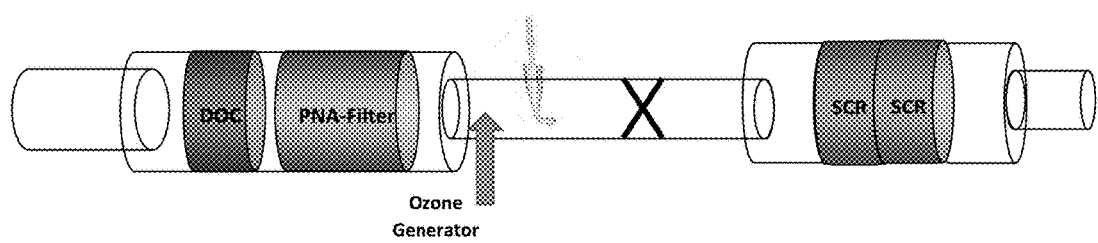
FIG. 2A shows a system having a DOC coupled with a PNA on a filter, followed by an ozone generator and a downstream SCR catalyst.

As shown in FIG. 2A, a system was prepared having a DOC coupled with a PNA on a filter, followed by an ozone generator and a downstream SCR catalyst.

Figure 2B:
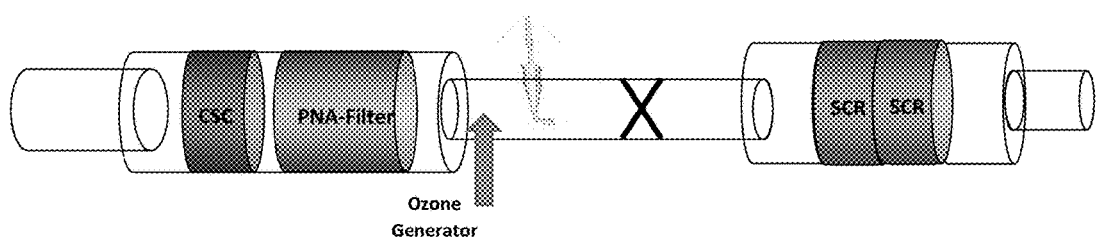
FIG. 2B shows a system having a cold start catalyst coupled with a PNA on a filter, followed by an ozone generator and a downstream SCR catalyst.
Figure 3A:
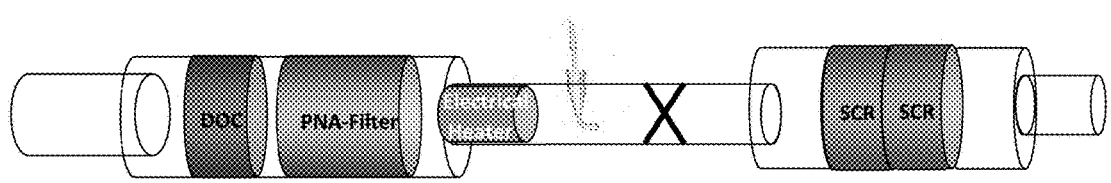
FIG. 3A shows a system having a DOC coupled with a PNA on a filter, followed by an electrical heater and a downstream SCR catalyst.
Figure 3B:
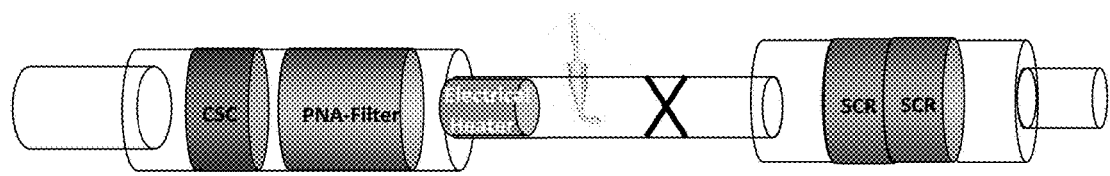
FIG. 3B shows a system having a cold start catalyst coupled with a PNA on a filter, followed by an electrical heater and a downstream SCR catalyst.

As shown in FIG. 2B, a system was prepared having a cold start catalyst coupled with a PNA on a filter, followed by an ozone generator and a downstream SCR catalyst.

Figure 4A:
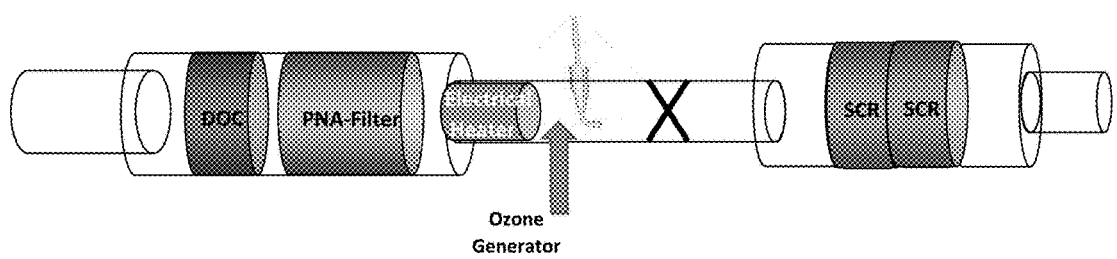
FIG. 4A shows a system having a DOC coupled with a PNA on a filter, followed by an electrical heater, an ozone generator, and a downstream SCR catalyst.

As shown in FIG. 4A, a system was prepared having a DOC coupled with a PNA on a filter, followed by an electrical heater, an ozone generator, and a downstream SCR catalyst.

Figure 4B:
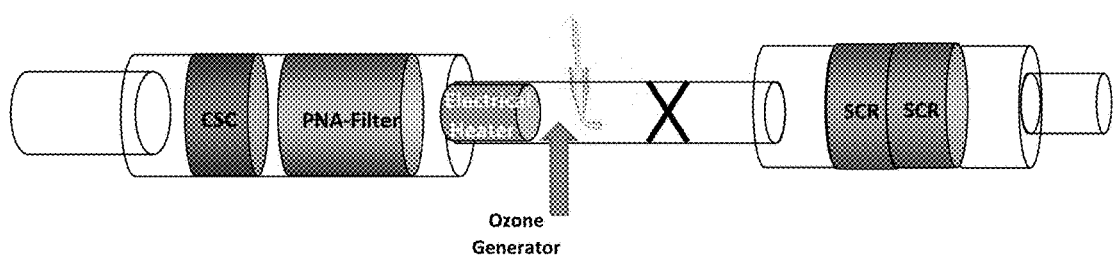
FIG. 4B shows a system having a cold start catalyst coupled with a PNA on a filter, followed by an electrical heater, an ozone generator, and a downstream SCR catalyst.
Figure 5A:
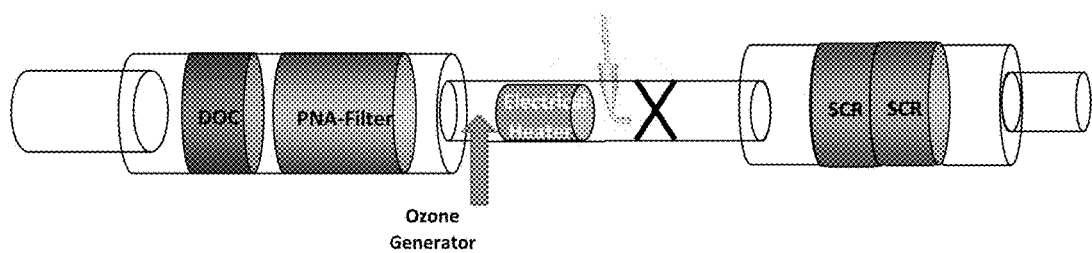
FIG. 5A shows a system having a DOC coupled with a PNA on a filter, followed by an ozone generator, an electrical heater, and a downstream SCR catalyst.
Figure 5B:
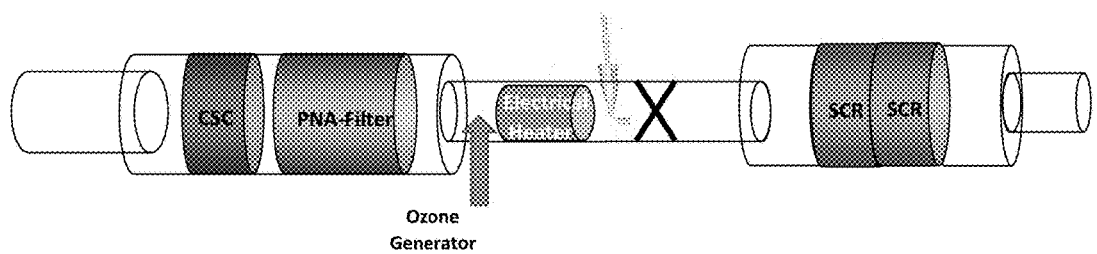
FIG. 5B shows a system having a cold start catalyst coupled with a PNA on a filter, followed by an ozone generator, an electrical heater, and a downstream SCR catalyst.

As shown in FIG. 4B, a system was prepared having a cold start catalyst coupled with a PNA on a filter, followed by an electrical heater, an ozone generator, and a downstream SCR catalyst.

Each system was tested using an ISL 2007, 8.9 L displacement, HDD cold FTP cycles. The engine-out NOx was 4.0 g/hp-hr and the ammonia:NOx ratio was about 1.2 to about 1.3. The following conditions were used:

For the systems of FIGS. 1A and 1B, SCRF/SCR were pre-saturated with NH₃ before the cold start.

For the systems of FIGS. 2A and 2B, SCRF/SCR were pre-saturated with NH₃ before the cold start. Ozone generator was run until SCR inlet temperature reached 210° C.

Figure 6:
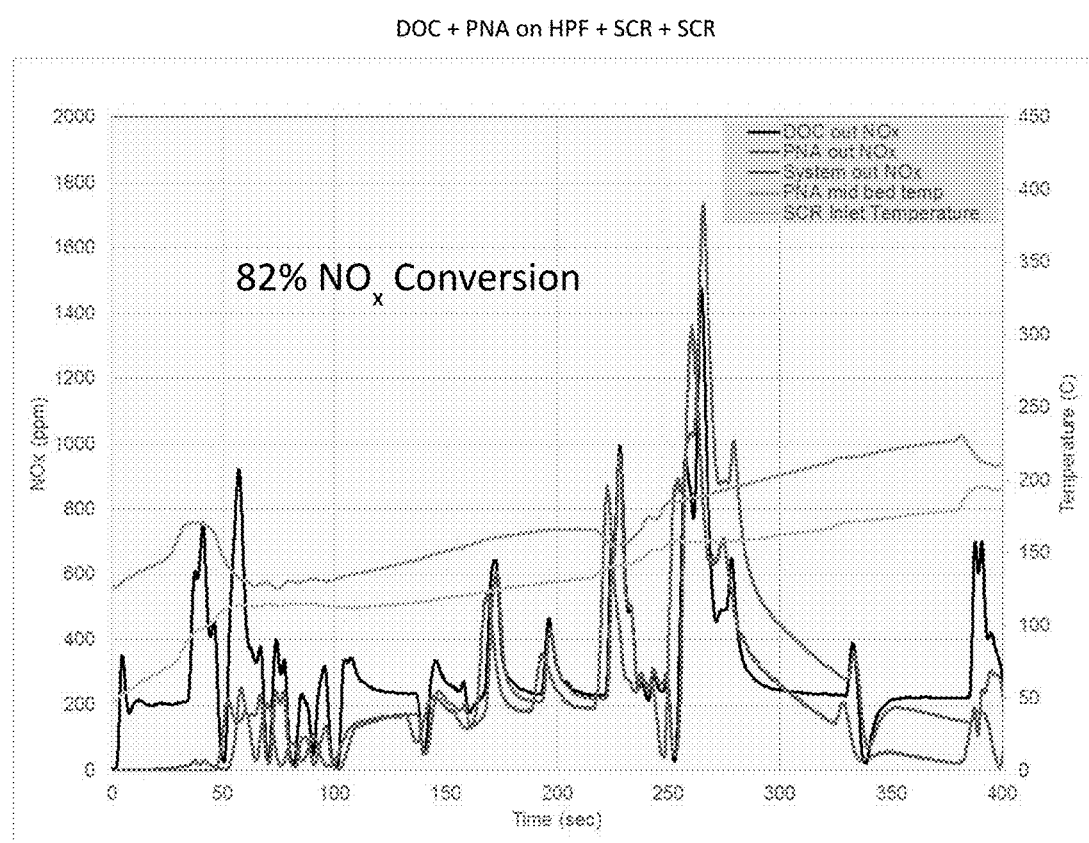
FIG. 6 shows test results for the system of FIG. 1A, including NOx measurements at the outlet of the DOC, at the outlet of the PNA, and at the outlet of the overall system, the PNA mid-bed temperature, and SCR inlet temperature.

FIG. 6 shows results for the system of FIG. 1A. The results show the NOx measurements at the outlet of the DOC, at the outlet of the PNA, and at the outlet of the overall system. The PNA mid-bed temperature and SCR inlet temperature are also shown. The system achieved an 82% NOx conversion.

Figure 7:
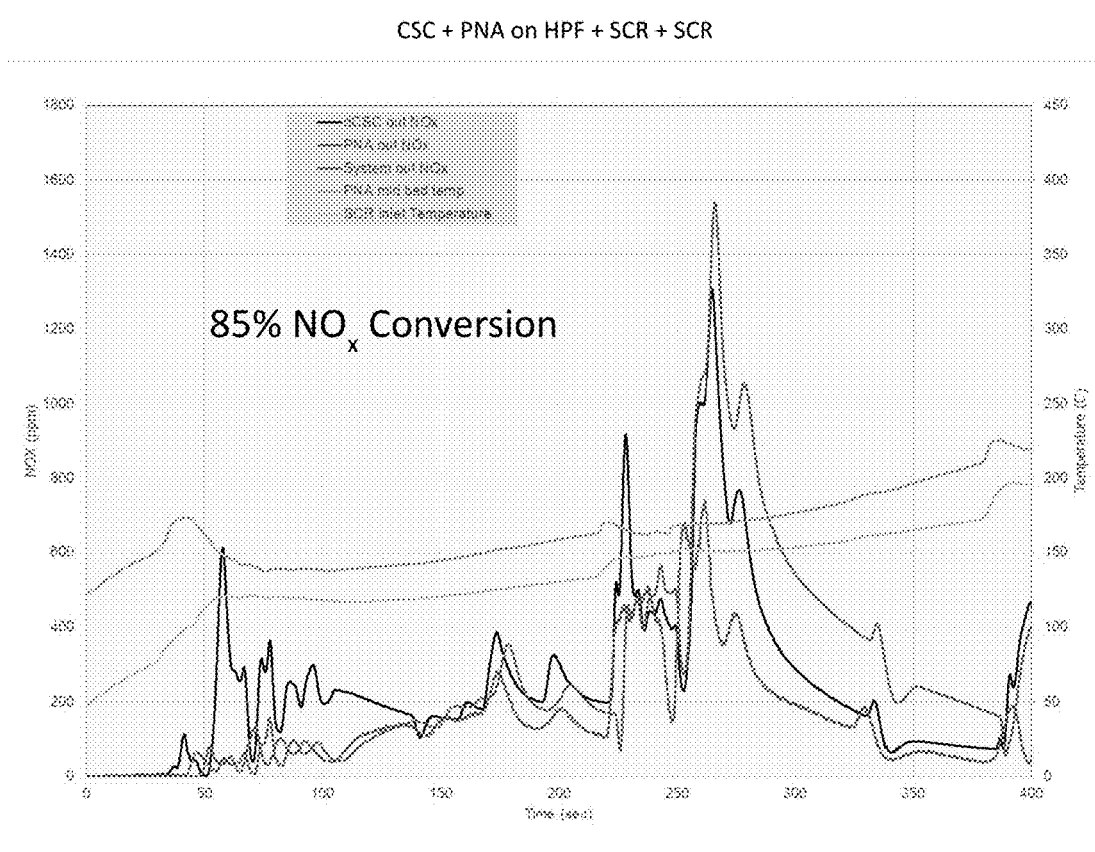
FIG. 7 shows test results for the system of FIG. 1B, including NOx measurements at the outlet of the cold start catalyst, at the outlet of the PNA, and at the outlet of the overall system, the PNA mid-bed temperature, and SCR inlet temperature.

FIG. 7 shows results for the system of FIG. 1B. The results show the NOx measurements at the outlet of the cold start catalyst, at the outlet of the PNA, and at the outlet of the overall system. The PNA mid-bed temperature and SCR inlet temperature are also shown. The system achieved an 85% NOx conversion.

Figure 8A:
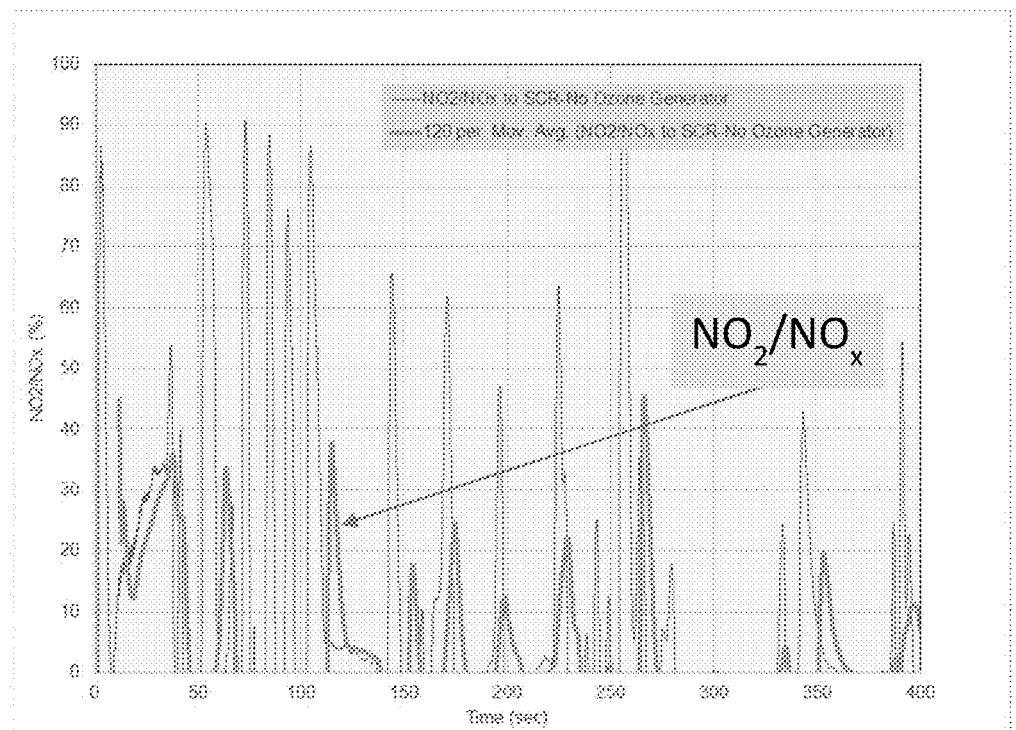
FIGS. 8A and 8B show the $NO_2/NOx$ % over time, measured at the SCR inlet of the systems of FIGS. 1A and 1B, respectively.
Figure 8B:
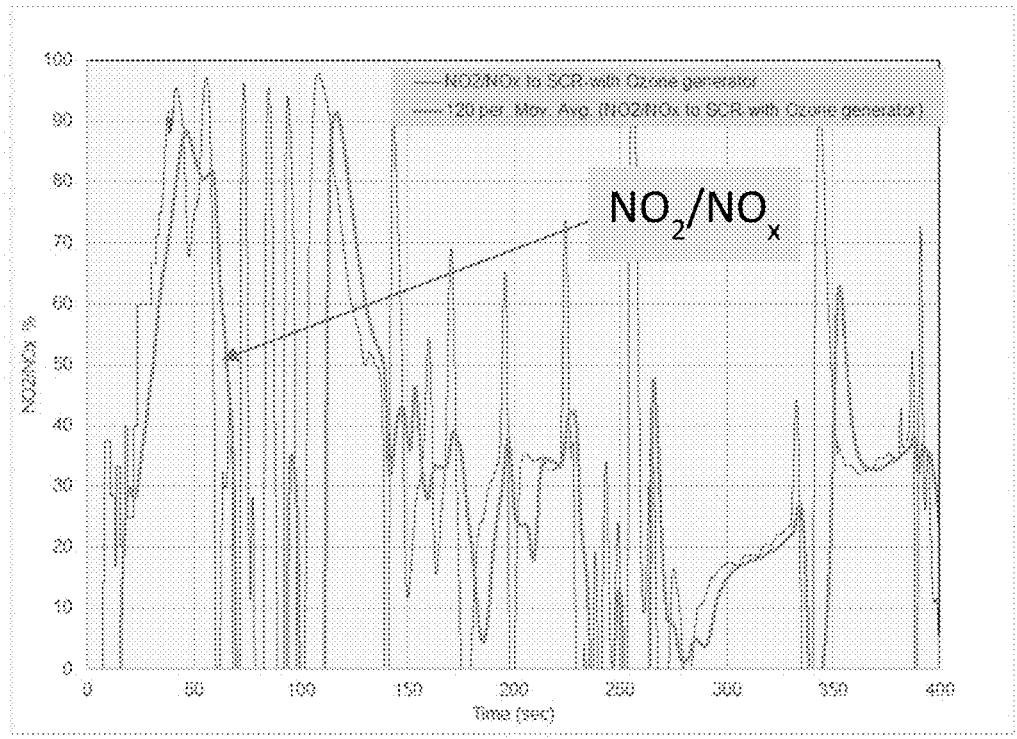

FIGS. 8A and 8B shows the NO$_2$/NOx % over time, measured at the SCR inlet of the systems of FIGS. 1A and 1B, respectively. The results show higher NO$_2$ make using the ozone generator (i.e., the system of FIG. 1B).

Figure 9:
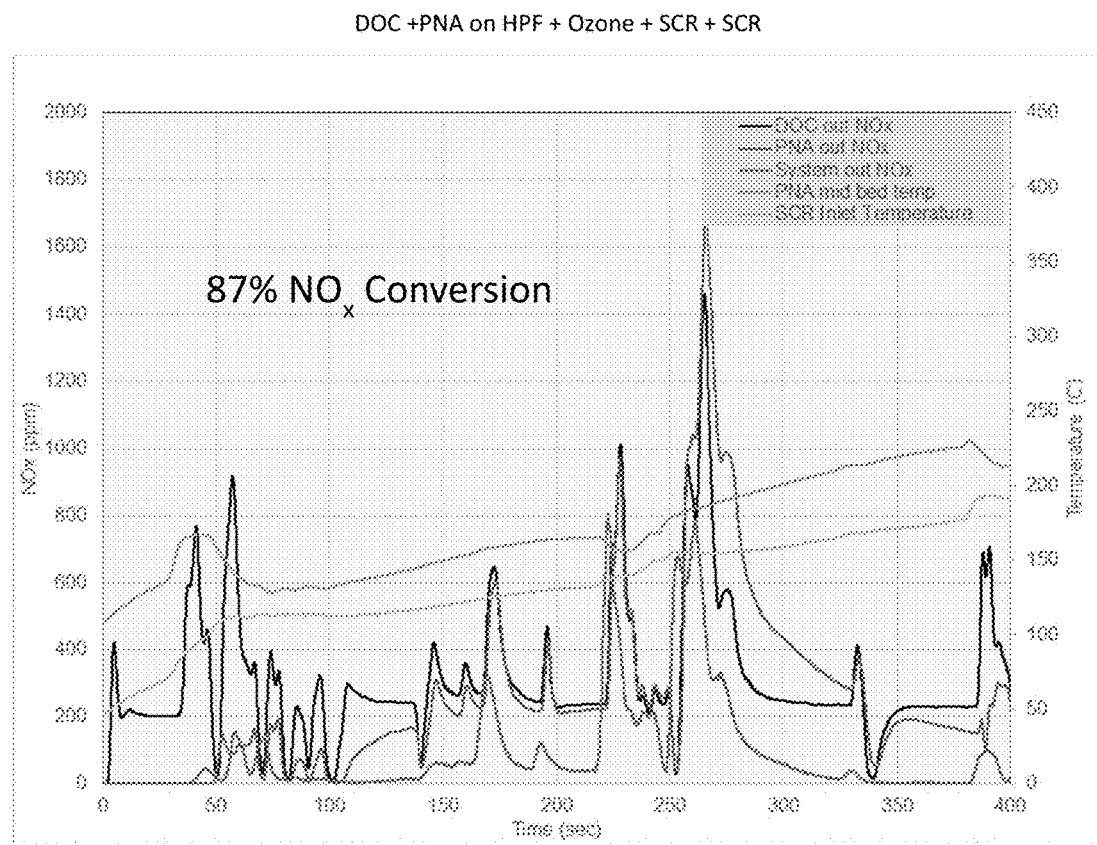
FIG. 9 shows test results for the system of FIG. 2A, including NOx measurements at the outlet of the DOC, at the outlet of the PNA, and at the outlet of the overall system, the PNA mid-bed temperature, and SCR inlet temperature.

FIG. 9 shows results for the system of FIG. 2A. The results show the NOx measurements at the outlet of the DOC, at the outlet of the PNA, and at the outlet of the overall system. The PNA mid-bed temperature and SCR inlet temperature are also shown. The system achieved an 87% NOx conversion.

Figure 10:
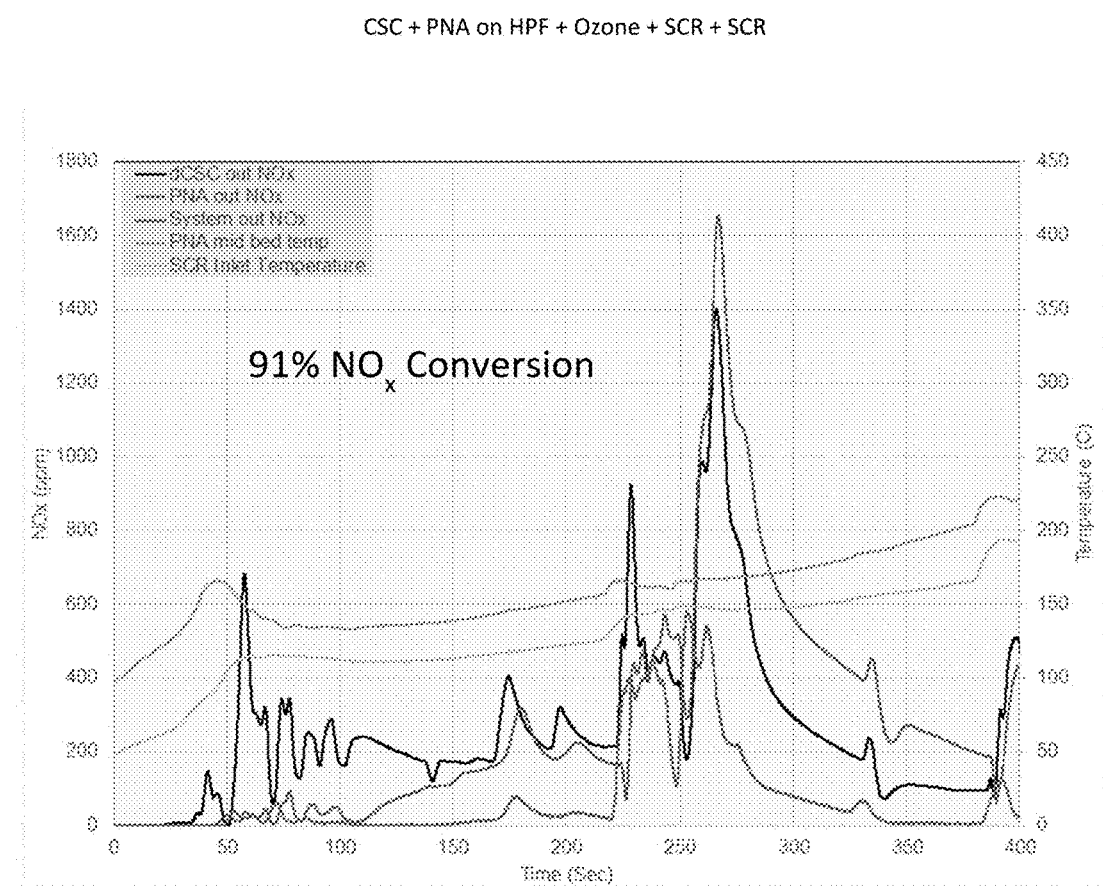
FIG. 10 shows test results for the system of FIG. 2B, including NOx measurements at the outlet of the cold start catalyst, at the outlet of the PNA, and at the outlet of the overall system, the PNA mid-bed temperature, and SCR inlet temperature.

FIG. 10 shows results for the system of FIG. 2B. The results show the NOx measurements at the outlet of the cold start catalyst, at the outlet of the PNA, and at the outlet of the overall system. The PNA mid-bed temperature and SCR inlet temperature are also shown. The system achieved a 91% NOx conversion.

Figure 11:
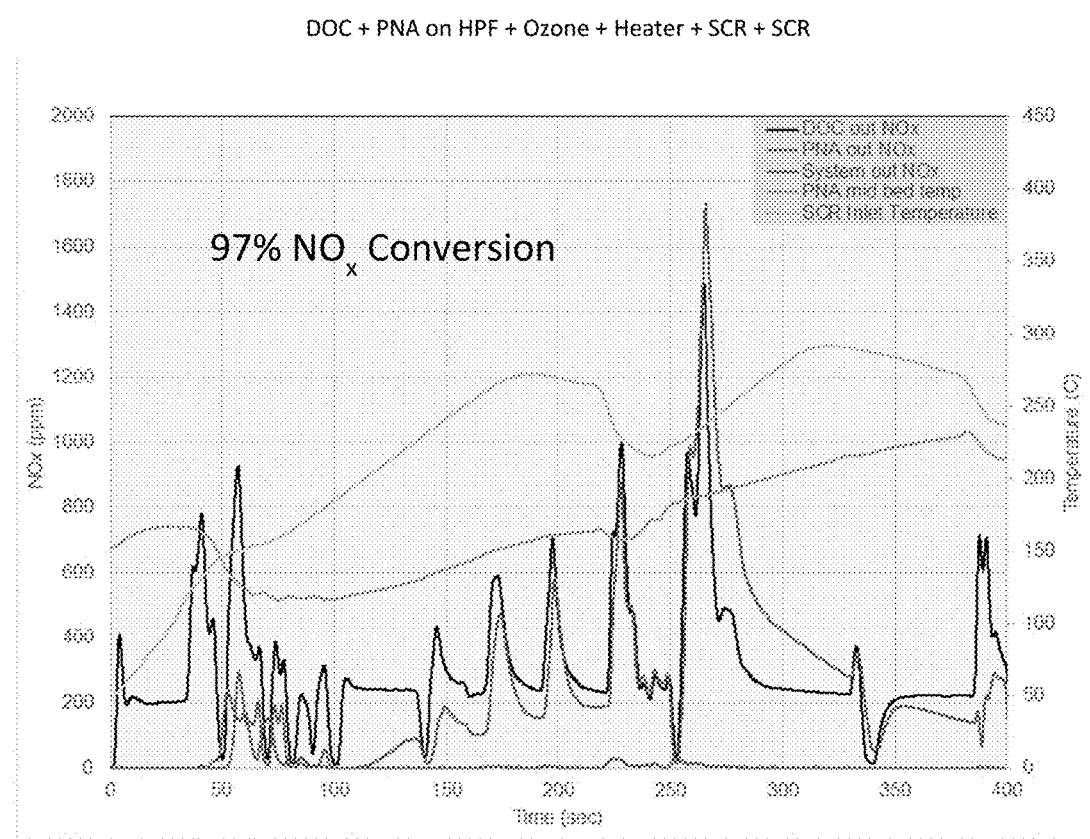
FIG. 11 shows test results for the system of FIG. 4A, including NOx measurements at the outlet of the DOC, at the outlet of the PNA, and at the outlet of the overall system, the PNA mid-bed temperature, and SCR inlet temperature.

FIG. 11 shows results for the system of FIG. 4A. The results show the NOx measurements at the outlet of the DOC, at the outlet of the PNA, and at the outlet of the overall system. The PNA mid-bed temperature and SCR inlet temperature are also shown. The system achieved a 97% NOx conversion.

Figure 12:
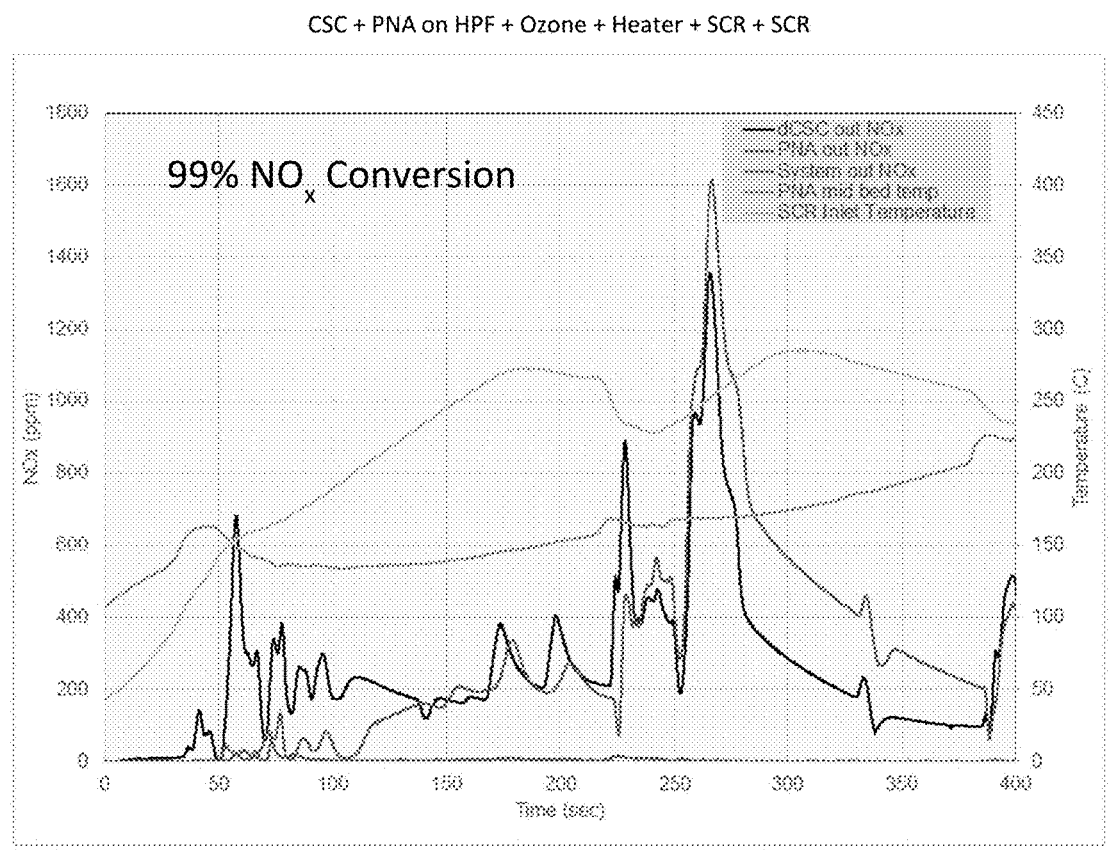
FIG. 12 shows test results for the system of FIG. 4B, including NOx measurements at the outlet of the cold start catalyst, at the outlet of the PNA, and at the outlet of the overall system, the PNA mid-bed temperature, and SCR inlet temperature.

FIG. 12 shows results for the system of FIG. 4B. The results show the NOx measurements at the outlet of the cold start catalyst, at the outlet of the PNA, and at the outlet of the overall system. The PNA mid-bed temperature and SCR inlet temperature are also shown. The system achieved a 99% NOx conversion.

Figure 13:
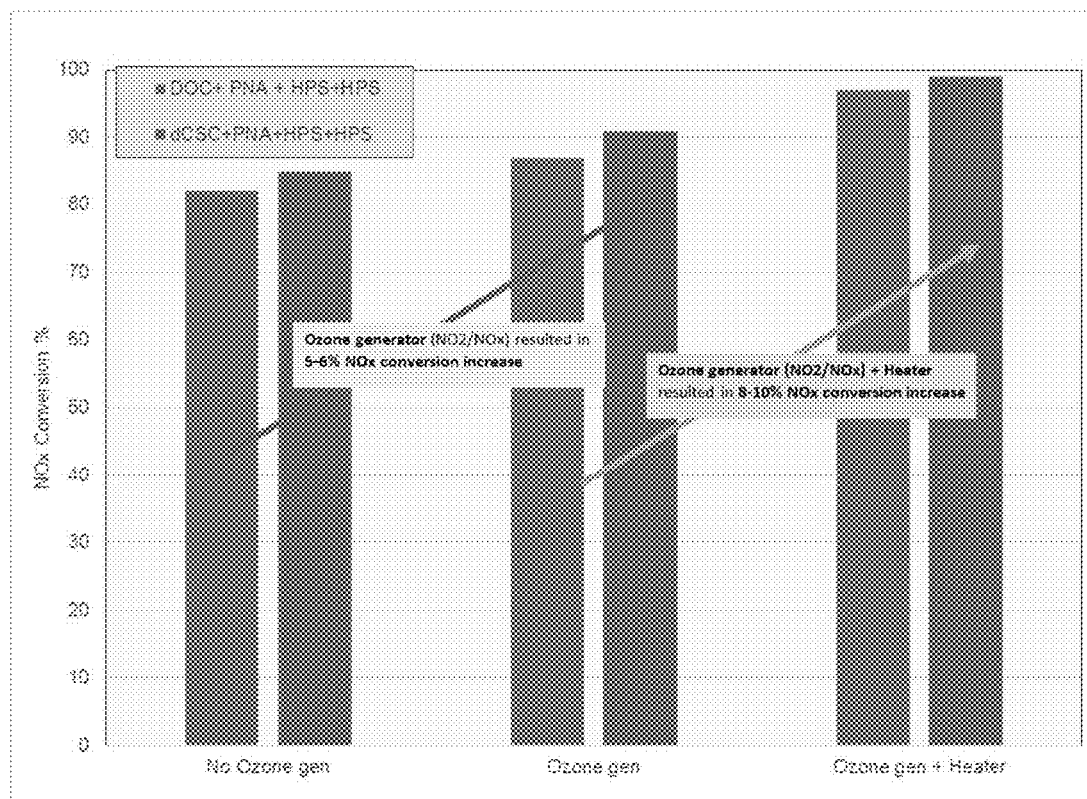
FIG. 13 shows NOx conversion for the systems having no ozone generator (systems of FIGS. 1A and 1B), systems having an ozone generator (systems of FIGS. 2A and 2b), and systems having an ozone generator and heater (systems of FIGS. 4A and 4B).

FIG. 13 shows NOx conversion for the systems having no ozone generator (systems of FIGS. 1A and 1B), systems having an ozone generator (systems of FIGS. 2A and 2b), and systems having an ozone generator and heater (systems of FIGS. 4A and 4B). The results show that the addition of an ozone generator results in a 5-6% increase in NOx conversion. The results also show that the addition of a heater to a system having an ozone generator results in an 8-10% increase in NOx conversion.

The invention claimed is:

1. An exhaust purification system for the reduction of emissions from an exhaust stream, comprising, in order:
   a. an upstream catalyst coupled with a passive NO$_x$ adsorber catalyst;
   b. means to contact the exhaust stream with ozone, to react NO in the exhaust stream with the ozone to produce NO$_2$;
   c. an SCR catalyst.

2. The system of claim 1, wherein the upstream catalyst comprises an oxidation catalyst and/or a cold start catalyst.

3. The system of claim 1, wherein the passive NO$_x$ adsorber catalyst comprises a filter substrate.

4. The system of claim 1, wherein the upstream catalyst and the passive NOx adsorber catalyst are included on a single substrate.

5. The system of claim 1, further comprising a means for heating the exhaust gas upstream of the means to contact the exhaust stream with ozone.

6. The system of claim 1, further comprising an SCRF catalyst located upstream of the SCR catalyst.

7. The system of any claim 1, further comprising an ASC downstream of the SCR catalyst.

8. A method of reducing emissions from an exhaust stream, comprising:
   a. contacting the exhaust stream with an upstream catalyst coupled with a passive NOx adsorber catalyst;
   b. oxidizing NO to NO$_2$ by contacting the exhaust stream with ozone;
   c. selectively catalytically reducing NO$_2$ to nitrogen by contacting the NO$_2$ produced from the oxidizing step with a reductant in the presence of an SCR catalyst.

9. The method of claim 8, wherein the upstream catalyst comprises an oxidation catalyst and/or a cold start catalyst.

10. The method of claim 8, wherein the passive NO$_x$ adsorber catalyst comprises a filter substrate.

11. The method of claim 8, wherein the upstream catalyst and the passive NOx adsorber catalyst are included on a single substrate.

12. The method of claim 8, further comprising heating the exhaust stream upstream of the SCR catalyst.

13. The method of claim 12, wherein the exhaust stream is heated before contacting the exhaust stream with ozone.

14. The method of claim 8, wherein the ozone is injected into the exhaust stream.

15. The method of claim 8, wherein step c further comprises contacting the exhaust stream with an SCRF catalyst located upstream of the SCR catalyst.

16. The method of claim 8, wherein about 20 wt % to about 80 wt % of the NO in the exhaust stream contacting the ozone is reacted with the ozone to produce NO$_2$.

17. The method of claim 8, wherein the exhaust stream comprises a NO$_2$/NO$_x$ % value of about 20 wt % to about 70 wt % at initiation of step C.

18. The method of claim 8, wherein step b is carried out at exhaust stream temperatures of 30° C. to 250° C.

19. The method of claim 8, wherein NOx conversion of the method is higher than NOx conversion of a method which is equivalent except lacks step b.

20. The method of claim 13, wherein NOx conversion of the method is higher than NOx conversion of a method which is equivalent except lacks step b and the heating step.

* * * * *